United States Patent [19]

Kudo et al.

[11] 4,228,266

[45] Oct. 14, 1980

[54] PROCESS FOR PRODUCING COPOLYMERIZED RESINS

[75] Inventors: Ken-ichi Kudo; Yoshihiko Kitagawa; Teruhisa Koyama, all of Niihama; Akira Takata, Habikino; Shuichi Kanagawa, Osaka; Tetsuo Yamaguchi, Takarazuka, all of Japan

[73] Assignee: Sumitomo Chemical Company, Limited, Osaka, Japan

[21] Appl. No.: 935,609

[22] Filed: Aug. 21, 1978

Related U.S. Application Data

[62] Division of Ser. No. 799,266, May 23, 1977, Pat. No. 4,129,557.

[30] Foreign Application Priority Data

May 26, 1976 [JP] Japan ................................ 51/61614
May 26, 1976 [JP] Japan ................................ 51/61615
Jul. 30, 1976 [JP] Japan ................................ 51/91490
Jul. 30, 1976 [JP] Japan ................................ 51/91491

[51] Int. Cl.$^2$ ..................... C08F 236/00; C08F 36/00; C08F 232/08
[52] U.S. Cl. ..................................... 526/283; 526/308; 526/313; 260/4 AR;5; 525/93; 525/210; 525/216
[58] Field of Search ............... 526/313, 281, 283, 282, 526/308

[56] References Cited

U.S. PATENT DOCUMENTS

| | | | |
|---|---|---|---|
| 2,583,638 | 1/1952 | Evans et al. | 526/313 |
| 3,963,653 | 6/1976 | Katayama et al. | 260/4 AR |
| 4,046,838 | 9/1977 | Feeney | 260/876 B |
| 4,102,834 | 7/1978 | Morimoto et al. | 260/4 AR |

OTHER PUBLICATIONS

Derwent, 49314U-AFG (JA473500-Q) "Thermoplastic Copolymers of (Di)cyclopentadiene".
Derwent, 77663A/43 (J78035-976)(9-20-78) "Tackifier for Pressure Sensitive Adhesives".
Derwent, 73767T-A (JA-7243307-R) "Thermoplastic Resin Prodn-by Polymsn of (Di)cyclopentadiene".

*Primary Examiner*—Joseph L. Schofer
*Assistant Examiner*—Herbert J. Lilling
*Attorney, Agent, or Firm*—Stevens, Davis, Miller & Mosher

[57] ABSTRACT

A novel copolymer resin having excellent compatibility with rubber and plastics, stable to air, easily soluble in the hydrocarbon solvents and free of gel, said resin being obtained either (1) by copolymerizing one or more of the monomeric substances selected from the group consisting of cyclopentadiene, dicyclopentadiene and alkyl-substituted compounds thereof and one or more of the substances selected from the hydroxystyrene derivatives, or (2) by copolymerizing one or more of the monomeric substances selected from the group consisting of cyclopentadiene, dicyclopentadiene and alkyl-substituted compounds thereof, one or more of the substances selected from the codimers of cyclopentadiene and/or alkyl-substituted compounds thereof and chain conjugated diolefins having 4 to 5 carbon atoms, and one or more of the substances selected from the hydroxystyrene derivatives. There are also provided compositions comprising said resin and rubber or thermoplastic high-molecular weight substances.

10 Claims, No Drawings

PROCESS FOR PRODUCING COPOLYMERIZED RESINS

This is a division of application Ser. No. 799,266 filed May 23, 1977, now U.S. Pat. No. 4,129,557.

This invention relates to the novel copolymer resins, methods of producing same and compositions comprising such resins. More particularly, this invention relates to (1) a resin obtained by copolymerizing (a) one or more of the monomeric substances selected from the group consisting of cyclopentadiene, dicyclopentadiene and alkyl-substituted compounds thereof (this group of substances being hereinafter referred to as DCPD group substance) and (b) one or more of the substances selected from the hydroxystyrene derivatives, (2) a resin obtained by copolymerizing (a) one or more of the substances selected from the DCPD group substances, (b) one or more of the codimers of cyclopentadiene and/or alkyl-substituted compounds thereof and chain conjugated diolefins having 4 to 5 carbon atoms (referred to as codimers, hereinafter), and (c) one or more of the substances selected from the hydroxystyrene derivatives, and (3) compositions obtained from blending of any of said resins and rubber or thermoplastic high-molecular weight materials.

Thermal copolymerization of cyclopentadiene and styrene is already known (U.S. Pat. No. 2,689,232), but the resin obtained from such copolymerization is poor in compatibility with the high-molecular weight materials such as rubbers and plastics due to absence of polar groups, and hence introduction of polar groups into such resin has been required. As regards copolymerization of cyclopentadiene and vinylphenol, U.S. Pat. No. 2,583,638 discloses a method of copolymerizing cyclopentadiene and vinylphenol by using a strong acid or tin chloride as catalyst or with the aid of heat. According to the method of this patent, however, since cyclopentadiene used as a starting monomer is polymerized by using a cationic polymerization catalyst, there takes place coloring or formation of a gel-like substance to an excessive degree in the course of polymerization, and also the resultant product proves to be unstable to the air: if it is left in the air, there is produced a portion insoluble in the hydrocarbon solvents.

There are also known a few methods of thermal copolymerization of cyclopentadienes and phenols. For instance, Japanese Pat. No. 17255/1967 reveals a wax-like product obtained from thermal copolymerization of dicyclopentadiene and p-cresol at 200° C. However, this product is poor in solubility in solvents and compatibility with the high-molecular weight materials. An improved version of this product is disclosed in Japanese Patent Kokai (Laid-Open) No. 35000/1972 which proposes thermal copolymerization of cyclopentadienes and phenols at a temperature of from 250° to 300° C. In this case, however, since copolymerizability of phenols with cyclopentadienes is very low, they are hard to copolymerize and hence a great deal of unreacted phenols are left over in the reaction system. This is a serious disadvantage in the industrial adaptations. Also, polymerization activity is lowered as the loadings of phenols increase, resulting in drop of the yield as well as molecular weight and softening point of the obtained resin.

An object of this invention is to provide a resin which is free of the said defects of the heretofore known resins of this type, that is, a resin which is high in compatibility with rubber or plastics, stable to the air, easily soluble in hydrocarbon solvents and free of gel.

Another object of this invention is to provide a method of producing such a copolymer resin in a high yield with no need of using any catalyst in a specified temperature range.

The present inventors found that the objective resins can be obtained by thermal copolymerization of (1) a monomer component comprising one or more of the DCPD group substances and one or more of hydroxystyrene derivatives or (2) a monomer component comprising one or more of the DCPD group substances, one or more of the afore-said codimers and one or more of hydroxystyrene derivatives at a temperature within a specified range of from 240° to 300° C. without using any catalyst.

The present invention provides a copolymerized resin having a softening point of 50° to 200° C., a number average molecular weight of 300 to 1,500 and a bromine number of less than 120 but usually higher than 30 and soluble in hydrocarbon solvents, the composition of said resin comprising (a) 30 to 97 mol % of one or more monomeric substances selected from cyclopentadiene, dicyclopentadiene and alkyl-substituted compounds thereof, and (b) 3 to 70 mol % of one or more hydroxystyrene derivatives, or (a) 5 to 95 mol % of one or more monomeric substances selected from cyclopentadiene, dicyclopentadiene and alkyl-substituted compounds thereof, (b) 2 to 25 mol % of one or more codimers of cyclopentadiene and/or an alkyl-substituted compounds thereof and a chain conjugated diolefin having 4 to 5 carbon atoms, and (c) 3 to 70 mol % of one or more hydroxystyrene derivatives, and also provides a method for producing the same, characterized in that a starting monomer component comprising (a) one or more monomeric substances selected from cyclopentadiene, dicyclopentadiene and alkyl-substituted compounds thereof and (b) one or more hydroxystyrene derivatives is copolymerized thermally at a temperature of 240° to 300° C. without using any catalyst, or characterized in that a starting monomer component comprising (a) one or more monomeric substances selected from cyclopentadiene, dicyclopentadiene and alkyl-substituted compounds thereof, (b) one or more codimers of cyclopentadiene and/or an alkyl-substituted compounds and a chain conjugated diolefin having 4 to 5 carbon atoms, and (c) one or more hydroxystyrene derivatives is copolymerized thermally at a temperature of 240° to 300° C. without using any catalyst.

Good compatibility of the resins of this invention with rubber or plastics is due to the presence of a polar group (—OH group) in the hydroxystyrene derivative, and the high resin yield attainable in this invention is due to the improved polymerization activity and high copolymerizability of the hydroxystyrene derivative. The fact that the resins obtained according to the method of this invention are stable to the air and easily soluble in hydrogen solvents and also stay free of gelation during polymerization is due to thermal copolymerization at a temperature within a specified range without using any catalyst, and it is also considered that use of said codimer or codimers in the copolymerization may bring about further improvements. As reviewed above, the resins provided according to the present invention are definitely different in nature from the resins obtained from the known catalytic polymerization techniques, and they were realised by a specific combination of starting monomers and polymerization conditions according to the present invention.

The DCPD group substances used in the present invention include cyclopentadiene, dicyclopentadiene and/or an alkyl-substituted compound thereof (such as methylcyclopentadiene, ethylcyclopentadiene, methyldicyclopentadiene and dimethyldicyclopentadiene), which may be used either singly or in combination.

The codimers used in this invention include the compounds produced by codimerizing cyclopentadiene or an alkyl-substituted compound thereof and a chain conjugated diolefin having 4 to 5 carbon atoms such as butadiene, isoprene and piperylene by the Diels-Alder reaction, and examples of such compounds include cyclopentadiene and butadiene codimer, cyclopentadiene and isoprene codimers, cyclopentadiene and piperylene codimers, methylcyclopentadiene and butadiene codimers, methylcyclopentadiene and isoprene codimers, and methylcyclopentadiene and piperylene codimers. These codimers may be used either singly or in combination, and they may contain a dimer and/or codimer of butadiene, isoprene and piperylene. It is also possible to use cyclopentadiene or the alkyl-substituted compound thereof and the chain conjugated diolefin in the form of monomers for the present thermal polymerization. The said DCPD group substances and codimers may be mixed independently of said other, but for industrial production, it is more advantageous to employ a $C_4$-$C_6$ fraction which is obtained from steam cracking of naphtha or such and which has been further subjected to a heat treatment to thermally dimerize diolefins in such fraction. Such fraction may contain a dimer of isoprene or piperylene or an unsaturated aromatic hydrocarbon, such as for example styrene, $\alpha$-methylstyrene, $\beta$-methylstyrene or vinyltoluene.

Examples of the hydroxystyrene derivatives include o-, m- and p-isomers of vinylphenol, propenylphenol, isopropenylphenol, vinylcresol, isopropenylcresol, hydroxystilbene, vinylisopropylphenol, isopropenylisopropylphenol, vinyl-tert-butylphenol, isopropenyl-tert-butylphenol, vinylethylphenol, isopropenylethylphenol, vinyldimethylphenol, vinyldiisopropylphenol, isopropenyldiisopropylphenol, vinylmethylethylphenol, isopropenyldimethylphenol and isopropenylmethylethylphenol. Preferred examples are vinylphenols and isopropenylphenols. The most preferred are isopropenylphenols. They may be used either singly or in combination.

The mixing ratios of the said starting monomers may be suitably selected depending on the composition of the resin to be obtained, but usually the following ratios are recommended.

In case of copolymerizing the DCPD group substance and the hydroxystyrene derivative, the former is used in an amount of 30 to 97 mol %, preferably 40 to 95 mol %, and the latter in an amount of 3 to 70 mol %, preferably 5 to 60 mol %. If the mixing ratio of the DCPD group substance is less than 30 mol %, or that of the hydroxystyrene derivative is over 70 mol %, excessive deterioration of the color of the obtained resin or unusual increase of the molecular weight may result, and also the obtained resin is worsened in compatibility with rubber and plastics and also becomes less soluble in hydrocarbon solvents. On the other hand, if the DCPD group substance mixing ratio exceeds 97 mol % or the hydroxystyrene derivative mixing ratio is less than 3 mol %, there is provided little effect of introduction of the polar groups into the resin and hence the obtained resin is low in compatibility with rubber and plastics.

In case of copolymerizing the DCPD group substance, the codimer and the hydroxystyrene derivative, the DCPD group substance is mixed in an amount of 3 to 93 mol %, preferably 15 to 85 mol %, the codimer in an amount of 4 to 40 mol %, preferably 10 to 35 mol %, and the hydroxystyrene derivative in an amount of 2 to 65 mol %, preferably 5 to 55 mol %. If the mixing ratio of the DCPD group substance is less than 3 mol %, or that of the hydroxystyrene derivative is over 65 mol %, excessive deterioration of color of the resin or unusual rise of the molecular weight may result, and also the obtained resin proves poor in compatibility with rubber and plastics and becomes less soluble in hydrocarbon solvents. On the other hand, if the mixing ratio of the DCPD group substance exceeds 93 mol % or that of the hydroxystyrene derivative is less than 2 mol %, there is provided little effect of introduction of the polar groups into the resin and hence the obtained resin is low in compatibility with rubber and plastics. Use of the codimer in an amount of less than 4 mol % results in deteriorated color and heat stability of the obtained resin, while use of the codimer in excess of 40 mol % results in a poor yield of the resin.

Now the methods of obtaining the copolymer resins according to the present invention are described.

For obtaining an objective resin of this invention, one or more of the DCPD group substances and one or more of the hydroxystyrene derivatives, or one or more of the DCPD group substances, one or more of the codimers and one or more of the hydroxystyrene derivatives are simultaneously fed into a reaction zone at the very beginning of polymerization and then copolymerized under heating, or alternatively one or more of the DCPD group substances may be first polymerized singly or at least one DCPD group substance and at least one of said codimers may be copolymerized and then the hydroxystyrene derivative or derivatives may be further copolymerized. Such polymerization methods are suitably selected depending on the type of apparatus for polymerization used and the nature of the resin to be produced. In any of these methods, no polymerization catalyst is required.

Although use of a solvent during the polymerization is not essential in the present invention, it is recommended to use a solvent for facilitating control of the reaction, and such solvent is preferably used in such an amount that the starting monomer concentration will become higher than 20% by weight because the monomer concentration of less than 20% by weight results in a low yield of the resin. The solvent is inactive to the present thermal polymerization, and includes an aromatic hydrocarbon such as benze toluene and xylene, or an aliphatic or alicyclic hydrcarbon such as hexane, heptane, kreosene and mineral spirit.

In the present invention, the polymerization temperature is limited within the range of 240° to 300° C., preferably 250° to 280° C., for the following reason. If the polymerization temperature is lower than 240° C., the obtained product turns out a wax-like solvent-insoluble resin, while if said temperature is over 300° C., the decomposition of the resin advances excessively to product a partly gelled solvent-insoluble resin with noticeable coloring. For obtaining the resins with uniform quality, it is important to maintain the polymerization temperature constant as strictly as possible within the said range.

The polymerization time is subject to no specific limitations, but it is usually within the range of 10 minutes to 20 hours. The longer the polymerization time, the higher is the yield. No specific limitations are attached to the polymerization pressure. The only requirement is that such polymerization pressure is not lower than the self-developed pressure in the sealed vessel at a specified temperature. The polymerization may be carried out either batchwise or continuously in a pressure vessel furnished with a pressure gauge and a thermometer. It is desirable to replace the air in the reaction system with an inert gas such as nitrogen or argon gas for preventing the undesirable decomposition of the resin during polymerization. The polymerization reaction can be accomplished by merely heating the reaction mixture for a predetermined period of time with or without agitation. The polymerization may be followed by additional aging polymerization at a temperature of 150° to 240° C.

After completion of the polymerization reaction, the solvent if any, unreacted monomers and low-molecular weight materials are removed out of the polymerization product to obtain a desired resin.

The resins obtained according to the above-described methods are defined in composition as specified below.

In the case of the resins obtained from DCPD group substances and hydroxystyrene derivatives, such resins usually contain 30 to 97 mol %, preferably 40 to 95 mol %, of one or more of the DCPD group substances and 3 to 70 mol %, preferably 5 to 60 mol %, of one or more of the hydroxystyrene derivatives. As for the compositions of the resins obtained from DCPD group substances, codimers and hydroxystyrene derivatives such resins contain 5 to 95 mol %, preferably 20 to 90 mol %, of one or more of the DCPD group substances, 2 to 25 mol %, preferably 5 to 20 mol %, of one or more of the codimers, and 3 to 70 mol %, preferably 5 to 60 mol %, of one or more of the hydroxystyrene derivatives. These definitions of the resin composition are for the same reasons as the afore-said regulation of the starting monomer compositions. In the resin composition, the hydroxystyrene derivative(s) can be determined quantitatively from the ratio of absorbency provided by the aromatic protons ($\tau$ value: 3 to 4) in the hydroxystyrene derivative to absorbency of the whole protons as observed from a nuclear magnetic resonance spectrum. The codimer(s) can be also determined from a nuclear magnetic resonance spectrum by measuring absorbency of methyl protons ($\tau$ value: around 8.5) derived from the chain conjugated diolefin in the codimer and absorbency of whole protons. It is also possible to determine the composition in the resin by analyzing the unreacted monomers by gas chromatography.

The softening point of the resins provided according to the present invention is within the range of 50° to 200° C., preferably 60° to 150° C., and the number average molecular weight is within the range of 300 to 1,500, preferably 350 to 1,000. The resins with a softening point of below 50° C. or a number average molecular weight of less than 300 give out an offensive smell and are also unstable to heat due to the high percentage of the low-molecular weight portion therein. On the other hand, those resins which are higher than 200° C. in softening point or greater than 1,500 in number average molecular weight are poor in compatibility with rubber and plastics and also low in solubility in hydrocarbon solvents.

The bromine number of the resins of this invention is 30 to 120, preferably 40 to 100. Such bromine number varies depending on the resin composition. The resins with a bromine number of less than 30, although high in stability against air, have few reactive unsaturated bonds, so that when such resins are used in applications where high reactivity is required, for example used as a rubber modifier, the desired modification effect can not be provided. The resins having a bromine number of greater than 120, although high in reactivity, are very unstable against air and tend to produce a gel-like material. Also, such resins are liable to form gel when subjected to polymerization.

The resins obtained according to the present invention are soluble in hydrocarbon solvents such as benzene, toluene, xylene, hexane, heptane and the like and are free of insoluble gel. This characteristic of the present resins is ascribable to use of a specified range of polymerization temperature.

The resins obtained according to the present invention can be further improved in properties by subjecting them to various kinds of modification reactions. For instance, $\alpha,\beta$-unsaturated mono- or di-carboxylic anhydride, $\alpha,\beta$-unsaturated mono- or di-carboxylic acid esters, $\alpha,\beta$-unsaturated mono- or di-carboxylic acids or $\alpha,\beta$-unsaturated nitriles may be further copolymerized with the starting monomers or may be reacted with the resins obtained from the present invention to increase the polar groups in the resins. In this case, however, the loadings of such carboxylic acids or nitriles should of course be defined so as not to affect the favorable properties possessed by the resins of this invention.

The resins obtained in the present invention still retain a significant proportion of unsaturated bonds which are responsible for coloring of the resin, but such unsaturated bonds in the resin can be saturated by hydrogenation to obtain a colorless resin having a bromine number of 0 to 20. Such hydrogenation can be accomplished by using the commonly employed conditions. For instance, it may be practiced by dissolving the resin in a hydrocarbon solvent, preferably an aliphatic hydrocarbon such as hexene, heptane or octane, or by simply melting without using any such solvent, and treating the dissolved resin with a catalyst in a pressure vessel. Such hydrogenation is usually practiced at a temperature between 100° and 300° C. under a pressure between 10 and 400 kg/cm². The catalyst used for such hydrogenation may be a metal such as nickel, cobalt, palladium, molybdenum, copper, chromium, etc., or an oxide thereof, which may be used either singly or in combination. Generally, such catalyst is supported on a carrier such as diatomaceous earth or alumina. The amount of the catalyst used is about 0.1 to 20% by weight based on the weight of the resin to be hydrogenated. The form of hydrogenation may be either batchwise or continuous. The hydrogenation rate is determined depending on the level to which the degree of unsaturation in the resin is to be lowered. The thus hydrogenated resins are very excellent in heat stability and colorless, so that such resins can be advantageously used for hot-melt adhesives, hot-melt coating agents, colorless pressure-sensitive adhesives and rubber additives.

The resins obtained in the way described above possess excellent properties and hence lend themselves to many uses. This means that the resins of this invention can be used as excellent substitutes for natural rosin, polyhydric alcohol esters of rosin and polyterpene resins which are widely used at present. This fact is of great significance in view of limited resources. It was found that if a resin of this invention is for example blended with a natural or synthetic rubber, there is provided an excellent softening and improved tackifying effects in the working process, and also noticeable improvements are made in rubber properties after vulcanization, particularly in flex cracking resistance, wear resistance and cut resistance, without retarding the rate of vulcanization or deteriorating the tensile characteristics of vulcanized rubber as in the case of rosin.

The resins of this invention can be applied to both natural and synthetic rubbers, including, for example, isoprene rubbers such as NR and IR, butadiene rubbers such as BR, SBR and NBR, olefin rubbers such as IIR and EPDM, and mixtures thereof, but they find best applications in BR and SBR.

The loadings of the resin of this invention in a rubber composition may vary depending on the kind of rubber and resin applied and the purpose of use of the vulcanized rubber blend, but for the purpose of improving the rubber properties, said resin is usually loaded in an amount of 2 to 40 weight parts, preferably 4 to 30 weight parts, per 100 weight parts of the rubber. It is also possible to suitably add a commonly employed type of vulcanizer, vulcanization accelerator, filler, reinforcing agent, softener, antioxidant and other rubber additives according to the intended use of the rubber.

For blending the resin of this invention in rubber, it is usually advisable to employ a kneading method using a roll mill or Banbury mixer. The vulcanizing conditions of the blend may vary depending on the composition and the vulcanization system employed, but usually such vulcanization can be accomplished at a temperature of 100° to 200° C. within a period of about 5 to 60 minutes. In case of using the blend for injection molding, only 2- to 3-minute vulcanization is needed.

It was also found that blending of the resin of this invention with a thermoplastic high-molecular weight material provides a hot-melt composition which has excellent compatibility with and adhesiveness to the base polymer as well as high heat resistance.

The hot-melt compositions are primarily composed of a base polymer and a tackifier, and if need be, may be further blended with a waxing compound, antioxidant, plasticizer, filler and so forth. The base polymer usable with the resins of this invention for production of such hot-melt compositions may be a thermoplastic high-molecular weight material such as an ethylene-vinyl acetate copolymer, ethylene-acrylic ester copolymer, polystyrene, polypropylene, polyamide, polyester, polyvinyl acetate, polyacetal, polyurethane, polyethylene, styrene-butadiene block copolymer and styrene-isobutylene block copolymer, but it is industrially advantageous to use an ethylene-vinyl acetate copolymer with a vinyl acetate content of 5 to 60% by weight and a melt index of 0.5 to 450. The resins of this invention can be advantageously used as tackifiers for said hot-melt compositions.

The blending ratio between the resin of this invention and the thermoplastic high-molecular weight material used for the composition varies depending on the purpose of use such as adhesives, coating agents, sealers and bonding agents for adhesive tapes. It also varies according to the type of the adherent even in the same pattern of use. Therefore, the blending ratio is not subject to any specific definition but can be suitably selected on the part of the user according to the desired form of use, but generally the resin of this invention is blended in an amount of 5 to 300 weight parts, preferably 50 to 200 weight parts, for every 100 weight parts of the thermoplastic high-molecular weight material.

For preparation of hot-melt compositions, there are usually blended in addition to the said thermoplastic high-molecular weight material and the resin of this invention, a minor proportion of a waxing compound such as paraffin wax, microcrystalline wax or polyethylene wax, antioxidant, plasticizer, filler and other additives as desired.

The resins of this invention find a variety of other uses such as base material for pressure-sensitive adhesives, paints, printing ink, plastic blends, traffic paints and emulsifiers.

In order to demonstrate the features of this invention more definitely, the invention is described in further detail hereinbelow by way of embodiments thereof, but these embodiments are not to be interpreted as being restrictive upon the scope of the present invention. The properties of the resins obtained according to the present invention were determined by the following methods.

| | |
|---|---|
| Color: | Gardner color scale (ASTM D-154-58T) molten resins |
| Softening point: | JIS-K 2531-60 Ring and ball method |
| Number average molecular weight: | Vapor pressure osmometry (benzene) |
| Bromine number: | JIS-K 5902 |
| Compatibility with high-molecular weight material: | Each obtained resin and various kinds of high-molecular weight materials were mixed in the ratio of 1:1 and then this mixture was dissolved in benzene to prepare a 20% benzene solution. This solution was spread on a polyester film and, after evaporation of benzene, turbidity of the formed coating film was observed with the naked eye. |
| Content of hydroxystyrene derivative(s) in resin: | Determined from the absorbency ratio between aromatic protons and whole protons as measured from a nuclear magnetic resonance spectrum. The resin composition was expressed by way of monomer units used. |
| Content of codimer(s) in resin: | Determined from the absorbency ratio between methyl protons based on chain conjugated diolefins in the codimer(s) and whole protons as measured from a nuclear magnetic resonance spectrum. (In Example 14, there was used a method of analyzing the unreacted monomers by gas chromatography). The resin composition was shown by monomer units used. |

EXAMPLES 1-3 AND COMPARATIVE EXAMPLES 1-3

Bicyclopentadiene and meta-isopropenylphenol, both with 97% purity, and xylene serving as solvent were fed in the ratios shown in Table 1 into a stainless steel autoclave with internal capacity of 100 ml, and after sealing the autoclave, the internal atmosphere thereof was replaced with nitrogen gas. Then the autoclave was heated to 260° C., followed by 4-hour polymerization under agitation. Four hours later, the autoclave was cooled down to room temperature and the polymer solution was drawn out. In drawing out the polymer solution, first xylene and unreacted monomers were distilled out at 230° C. and then the low-molecular weight portion was distilled off under reduced pressure, obtaining the resins having the properties such as shown in Table 1.

In Comparative Examples 1–3, polymerization was carried out in the same way as described above but by using a phenol (marketed product) instead of meta-isopropenylphenyl in amounts equimolar with meta-isopropenylphenol used in Examples 1–3, obtaining the resins having the properties shown in Table 1. It is noted from this table that in case of using the phenol, the resin yield, softening point and molecular weight drop as the charge of the polymerization materials increases, and the phenol component in the resin is very small in percentage, indicating low copolymerizability. In case of using meta-isopropenylphenol, the resin can be obtained in a high yield with no noticeable drop of softening point and molecular weight, and the high meta-isopropenylphenol content in the resin indicates excellent copolymerizability of meta-isopropenylphenol.

TABLE 1

| | Items | Example 1 | Example 2 | Example 3 | Comparative Example 1 | Comparative Example 2 | Comparative Example 3 |
|---|---|---|---|---|---|---|---|
| Starting materials | DCDP group substance | DCPD*1 | DCPD | DCPD | DCPD | DCPD | DCPD |
| | Charge (g) | 45.0 | 40.0 | 30.0 | 46.4 | 42.6 | 34.1 |
| | Charge (mol %) | 90.1 | 80.2 | 60.4 | 90.1 | 80.2 | 60.4 |
| | Hydroxystyrene derivative | Meta-isopropenylphenol | Meta-isopropenylphenol | Meta-isopropenylphenol | Phenol | Phenol | Phenol |
| | Charge (g) | 5.0 | 10.0 | 20.0 | 3.6 | 7.4 | 15.9 |
| | Charge (mol %) | 9.9 | 19.8 | 39.6 | 9.9 | 19.8 | 39.6 |
| | Xylene (g) | 20.0 | 20.0 | 20.0 | 20.0 | 20.0 | 20.0 |
| Properties of resins | Yield (%) | 86 | 88 | 92 | 63 | 58 | 49 |
| | Color (Gardner index) | 11 | 12 | 14 | 11 | 11 | 13 |
| | Softening point (°C.) | 130 | 137 | 139 | 134 | 120 | 103 |
| | Number average molecular weight | 590 | 600 | 650 | 580 | 510 | 440 |
| | Bromine number | 92 | 84 | 70 | 95 | 94 | 85 |
| | Hydroxystyrene derivative in resin (mol %) | 9.0 | 18.0 | 34.5 | 2.0 | 5.5 | 10.5 |
| | Solubility in toluene | Soluble | Soluble | Soluble | Soluble | Soluble | Soluble |

Note
*1Dicyclopentadiene

EXAMPLES 4–7

Into a 1-liter-capacity stainless steel autoclave were fed cyclopentadiene, dicyclopentadiene or dimethyldicyclopentadiene as DCPD group substance and vinylphenol or isopropenylphenol as hydroxystyrene derivative in the respective ratios shown in Table 2, followed by feeding of xylene, and after sealing the autoclave, the interior atmosphere thereof was replaced with nitrogen gas. The autoclave was then heated to 260° C. and the mixture therein was subjected to polymerization under agitation for 4 hours. After polymerization, the autoclave was cooled down to room temperature and the polymer solution was drawn out. Xylene and unreacted monomers were first distilled away at 180° C., followed by distilling-off of the low-molecular weight component under reduced pressure, consequently obtaining the resins having the properties such as shown in Table 2.

TABLE 2

| | Items | Example 4 | Example 5 | Example 6 | Example 7 |
|---|---|---|---|---|---|
| Starting materials | DCPD group substance | CPD*1 | CPD | DMDCPD*2 | DCPD*3 |
| | Charge (g) | 291 | 232 | 280 | 280 |
| | Charge (mol %) | 90.0 | 80.0 | 75.5 | 80.2 |
| | Hydroxystyrene derivative | Meta-vinylphenol | Meta-isopropenylphenol | Meta-vinylphenol | Isopropenylphenol*4 |
| | Charge (g) | 59 | 118 | 70 | 70 |
| | Charge (mol %) | 10.0 | 20.0 | 24.5 | 19.8 |
| | Xylene (g) | 350 | 350 | 350 | 350 |
| Properties of resin | Yield (%) | 90 | 95 | 88 | 90 |
| | Color (Gardner index) | 10 | 11 | 12 | 10 |
| | Softening point (°C.) | 110 | 130 | 122 | 105 |
| | Number average molecular weight | 540 | 640 | 600 | 520 |
| | Bromine number | 85 | 56 | 70 | 81 |
| | Hydroxystyrene | 9.5 | 19.0 | 24.0 | 18.5 |

| Items | Example 4 | Example 5 | Example 6 | Example 7 |
|---|---|---|---|---|
| derivative in resin (mol %) | | | | |
| Toluene solubility | Soluble | Soluble | Soluble | Soluble |

Notes
*[1]CPD: cyclopentadiene
*[2]DMDCPD: dimethyldicyclopentadiene
*[3]DCPD: dicyclopentadiene
*[4]Meta/para = 65/35 mixture

EXAMPLES 8-11

A mixture of a DCPD group material and codimers having the below-shown composition (DCPD fraction (A)) and meta-isopropenylphenol or vinylphenol were charged into a stainless steel autoclave with internal capacity of 1 liter, followed by further charging of xylene, and after sealing the autoclave, the interior atmosphere thereof was replaced with nitrogen gas. Then the autoclave was heated to 260° C. to practice the polymerization under agitation for 4 hours. After completion of the polymerization, the autoclave was cooled down to room temperature and the polymer solution was taken out. Xylene and unreacted monomers were first distilled off at 180° C. and then the low-molecular weight portion was distilled away, obtaining the resins having the properties such as shown in Table 3.

| Composition of DCPD fraction (A) | |
|---|---|
| Dicyclopentadiene | 75 mol % |
| Cyclopentadiene and isoprene codimer | 19 mol % |
| Cyclopentadiene and piperylene codimer | 3 mol % |
| Other components | 3 mol % | codimers having the following composition (DCPD fraction (B)) and isopropenylphenol (meta/para=65/35 mixture). The results are shown in Table 3.

| Composition of DCPD fraction (B) | |
|---|---|
| Dicyclopentadiene | 65 mol % |
| Cyclopentadiene and isoprene codimer | 24 mol % |
| Cyclopentadiene and piperylene codimer | 8 mol % |
| Other components | 3 mol % |

EXAMPLE 14

The same procedure as practiced in Examples 8-11 was repeated except for use of a mixture of a DCPD group substance and a codimer having the following composition (DCPD fraction (C)), obtaining the results shown in Table 3.

| Composition of DCPD fraction (C) | |
|---|---|
| Dimethyldicyclopentadiene | 76 mol % |
| Methylcyclopentadiene and isoprene codimer | 21 mol % |
| Other components | 3 mol % |

TABLE 3

| | Items | Example 8 | Example 9 | Example 10 | Example 11 | Example 12 | Example 13 | Example 14 |
|---|---|---|---|---|---|---|---|---|
| Starting materials | DCPD group substance(s) + codimer(s) | DCPD fraction (A) | DCPD fraction (A) | DCPD fraction (A) | DCPD fraction (A) | DCPD fraction (B) | DCPD fraction (B) | DCPD fraction (C) |
| | Charge (g) | 315 | 280 | 210 | 280 | 315 | 210 | 280 |
| | Charge (mol %) | 90.1 | 80.2 | 60.4 | 78.4 | 90.1 | 60.4 | 77.1 |
| | Hydroxystyrene derivative | Meta-isopropenylphenol | Meta-isopropenylphenol | Meta-isopropenylphenol | Meta-vinylphenol | Isopropenylphenol*[2] | Isopropenylphenol*[2] | Meta-isopropenylphenol |
| | Charge (g) | 35 | 70 | 140 | 70 | 35 | 140 | 70 |
| | Charge (mol %) | 9.9 | 19.8 | 39.6 | 21.6 | 9.9 | 39.6 | 22.9 |
| | Xylene (g) | 350 | 350 | 350 | 350 | 350 | 350 | 350 |
| Properties of resin | Yield (%) | 75 | 80 | 82 | 82 | 71 | 80 | 85 |
| | Color (Gardner index) | 9 | 10 | 12 | 11 | 8 | 10 | 12 |
| | Softening point (°C.) | 100 | 105 | 106 | 102 | 95 | 105 | 112 |
| | Number average molecular weight | 520 | 520 | 530 | 510 | 500 | 530 | 610 |
| | Bromine number | 90 | 81 | 65 | 80 | 85 | 52 | 75 |
| | Hydroxystyrene derivative in resin (mol %) | 9.5 | 18.5 | 35.5 | 20.5 | 11.0 | 42.0 | 20.0 |
| | Codimer(s) in resin (mol %)*[1] | 12.0 | 9.5 | 7.0 | 8.5 | 17.5 | 11.5 | 9.0 |

Notes
*[1]Codimer(s): (methyl)cyclopentadiene and isoprene codimer or cyclopentadiene and piperylene codimer
*[2]Meta/para = 65/35 mixture

EXAMPLES 12-13

The polymerization was carried out by following the same procedure as practiced in Examples 8-11 except for use of a mixture of a DCPD group material and

EXAMPLE 15

50 Grams (0.76 moles) of cyclopentadiene, 230 g (1.74 moles) of DCPD fraction (A) used in Examples 8-11 and 70 g of meta-isopropenylphenol were fed into a stainless steel autoclave with internal capacity of 1 liter, followed by feeding of 350 g of xylene, and after sealing the autoclave, the mixture therein was subjected to the same polymerization process as performed in Examples 8-11, consequently obtaining a resin in the yield of 84%. The color of this resin, as expressed by Gardner index, was 9, and it had softening point of 106° C., number average molecular weight of 530 and bromine number of 80. The meta-isopropenylphenol content in the resin was 19.0 mol % and that of the codimers was 8.5%.

EXAMPLES 16-17

50.0 Grams of each of the resins obtained in Examples 2 and 9 was dissolved in 100.0 g of n-heptane, and this solution was fed into a 1-liter-capacity stainless steel autoclave together with 6.0 g of a 50% nickel-alumina supported catalyst. After sealing the autoclave, the interior atmosphere thereof was replaced with hydrogen, and after charged with 70 kg/cm² of hydrogen, the autoclave was heated up to 230° C. under agitation for approximately 1 hour. This temperature was maintained for four hours. After the reaction, the autoclave was cooled down to room temperature, and the obtained reaction solution was filtered to eliminate the catalyst, obtaining a colorless transparent reaction solution. Then heptane was distilled off from this solution to obtain a colorless resin.

The resin obtained in Example 16 had color (expressed by Gardner index) of less than 1, softening point of 145° C., number average molecular weight of 610 and bromine number of 5, and the resin obtained in Example 17 had color shade (expressed by Gardner index) of less than 1, softening point of 110° C., number average molecular weight of 530 and bromine number of 4.

COMPARATIVE EXAMPLES 4-6

The same polymerization procedures as practiced in Examples 2, 3 and 9 were followed except that the polymerization temperature was changed to 200° C. The obtained polymer solutions were opaque and contained gel-like matter. Elimination of the solvent from these polymer solutions gave a wax-like material. This material was different from those obtained in Examples 2, 3 and 9 and insoluble in toluene. The resin yield was 19% in Comparative Example 4, 41% in Comparative Example 5 and 32% in Comparative Example 6. Other properties were unmeasurable because the obtained resins were insoluble in toluene.

COMPARATIVE EXAMPLES 7-8

The processes of Examples 2 and 9 were repeated in the same way except that a commercially available styrene was used instead of meta-isopropenylphenol. The resin obtained from Comparative Example 7 had softening point of 102° C., number average molecular weight of 610 and yield of 77%, while the resin obtained from Comparative Example 8 had softening point of 98° C., number average molecular weight of 600 and yield of 75%.

EXAMPLE 18

Compatibility of the resins obtained in Examples 2, 9, 16 and 17 and Comparative Examples 7 and 8 with various kinds of high-molecular weight substances, that is, an ethylene-vinyl acetate copolymer (Sumitate KC-10 ® produced by Sumitomo Chemical Co., vinyl acetate content: 28 wt %, MI: 150), an ethylene-ethylacrylate copolymer (ethylacrylate content: 33.5 wt %, MI: 128), a natural rubber (Mooney viscosity: 55) and a styrene-butadiene block copolymer (Cariflex ® 1101 produced by Shell Co.), was examined. The results are shown in Table 4. Compatibility was rated by the following three grades.

A: Excellent. No turbidity.
B: Good. Slight turbidity.
C: Poor. Opaque as a whole.

TABLE 4

| High-molecular weight material | Resin | | | | | |
|---|---|---|---|---|---|---|
| | Example 2 | Example 9 | Example 16 | Example 17 | Comparative Example 7 | Comparative Example 8 |
| Ethylene-vinyl acetate copolymer | A | A | A | A | C | C |
| Ethylene-ethylacrylate copolymer | A | A | A | A | C | C |
| Natural rubber | A | A | A | A | B | B |
| Styrene-butadiene copolymer rubber | A | A | A | A | B | B |

EXAMPLE 19

Preparation of resins (resins A-E)

100 Parts of a mixture of a DCPD group material and an hydroxystyrene derivative (mixed at the rate shown in Table 5) and 100 parts of xylene were fed into a 1-liter autoclave and subjected to copolymerization under the conditions of 2 kg/cm² nitrogen pressure, 260° C. temperature and 4-hour reaction time, and after the polymerization, unreacted monomers and xylene were distilled off from the reaction solution. In this way, there was obtained the copolymer resins shown in Table 5. The softening point was adjusted to the order of 100° C. by changing the distillation temperature. For sake of comparison, similar polymerization was conducted by adding no hydroxystyrene derivative or by adding more than 70 mol % of a hydroxystyrene derivative to obtain the resins also shown in Table 5.

TABLE 5

| | Resin | Starting materials (weight %) | | | | Softening point (°C.) | Hydroxystyrene derivative in resin (mol %) |
|---|---|---|---|---|---|---|---|
| | | DCPD group substance | | Hydroxystyrene derivative | | | |
| Resins of this invention | A | DCPD | 90 | Meta-isopropenyl-phenol | 10 | 100 | 9.0 |
| | B | DCPD fraction | 80 | Meta-isopropenyl-phenol | 20 | 102 | 18.5 |
| | C | CPD | 40 | Meta-isopropenyl-phenol | 60 | 103 | 42.5 |
| Comparative | D | DCPD | 100 | — | | 100 | — |
| | E | DCPD | 10 | Meta-isopropenyl- | 90 | 103 | 89.6 |

TABLE 5-continued

| | Resin | Starting materials (weight %) DCPD group substance | | Hydroxystyrene derivative | | Softening point (°C.) | Hydroxystyrene derivative in resin (mol %) |
|---|---|---|---|---|---|---|---|
| resin | | | | phenol | | | |
| | F | DCPD | 80 | Styrene | 20 | 102 | — |
| | G | DCPD | 80 | Phenol | 15 | 99 | — |

Notes
DCPD: Dicyclopentadiene
DCPD fraction: A fraction consisting of 75 mol % of dicyclopentadiene, 19 mol % of a cyclopentadiene and isoprene codimer, 3 mol % of a cyclopentadiene and piperylene codimer, and 3 mol % of otner components.
CPD: cyclopentadiene

Rubber Compositions 1

Resins A, B, C and D obtained in the above-said preparation example, a process oil and a resin were added, each in an amount of 10 parts, to a blend of the following prescription, and the obtained compositions were subjected to a kneading workability test by using the Brabender Plastograph.

| Blend | |
|---|---|
| Butadiene rubber (BR 01 by Japan Synthetic Rubber Co.) | 100 parts |
| ZnO | 5 parts |
| H.A.F. black | 50 parts |
| Sulfur | 2 parts |
| N-cyclohexanebenzothiazyl-sulpheneamide | 1 part |

The test was conducted under the following conditions: temperature, 100° C.; rotor speed, 50 r.p.m.; kneading rate, 45 g/50 cc. The results are shown in Table 6 below.

TABLE 6

| | Examples of this invention | | | Comparative Examples | | |
|---|---|---|---|---|---|---|
| | Test No. | | | | | |
| | 1 | 2 | 3 | 4 | 5 | 6 |
| | Resin | | | | | |
| Properties | A | B | C | D | J*1 | K*2 |
| Minimum torque (kg . m) | 2.55 | 2.60 | 2.63 | 3.21 | 2.63 | 2.70 |
| Temperature after 20-minute kneading (°C.) | 140 | 138 | 137 | 155 | 142 | 145 |

*1Process oil: Circosol 42 × H (by Sun Oil Co.)
*2Rosin: Gum Rosin WW (by Arakawa Rinsan Kagaku Co.)

These results indicate that the specified resins according to this invention are small in minimum torque value and rise of temperature and are equal to or better than process oil and rosin and far better than the single dicyclopentadiene resins in workability.

Rubber Compositions 2

The above-said specified resins A, B and C of this invention, comparative resins D and E, a process oil, a resin and a phenol resin modified cyclopentadiene resin were mixed respectively, each in an amount of 14 parts, in the following blend and each mixture was kneaded by rolls. The unvulcanized rubbers were subjected to an adhesion test, while the vulcanized rubbers, which have undergone 40-minute vulcanization at 150° C., were subjected to a tensile test, flexing test, wear test and impact cutting test.

| Blend | |
|---|---|
| SBR (SBR 1500 by Sumitomo Chemical Co.) | 100 parts |
| Stearic acid | 3 parts |
| ZnO | 5 parts |
| H.A.F. black | 50 parts |
| Sulfur | 2 parts |
| N-cyclohexylbenzothiazyl-sulpheneamide | 1 part |

The adhesion test was made on the specimens allowed 3-day standing after kneading by using a Monsanto Tel-Tak. The tensile test was conducted according to JIS K 6301. In the flexing test, the length of crack after 30,000 times of flexing according to JIS K 6301 was measured. The wear test was practiced by using an Akron Abrasion Tester, measuring the amount of wear loss after 2,000 rotations at speed of 40 r.p.m. and under load of 4.5 kg. In the impact cut test, the cut depth was measured by using a pendulum impact cut tester which is a modified version of the Sharpy impact tester. The results are shown in Table 7 below.

TABLE 7

| | Examples of this invention | | | Comparative Examples | | | | |
|---|---|---|---|---|---|---|---|---|
| | Test No. | | | | | | | |
| | 7 | 8 | 9 | 10 | 11 | 12 | 13 | 14 |
| | Resin | | | | | | | |
| Properties | A | B | C | D | E | J*1 | K*2 | L*3 |
| Adhesion (oz/5 × 5 mm²) | 35 | 36 | 36 | 27 | 32 | 4 | 36 | 31 |
| Tensile strength (Kg/cm²) | 254 | 258 | 256 | 235 | 247 | 249 | 240 | 242 |
| Elongation (%) | 660 | 640 | 660 | 670 | 670 | 590 | 700 | 690 |
| 300% tensile stress (kg/cm²) | 109 | 114 | 110 | 90 | 96 | 103 | 84 | 91 |
| Flex cracking resistance (mm) | 7.4 | 6.6 | 7.8 | 8.6 | 9.4 | 14.2 | 8.0 | 9.8 |
| Wear resistance (mg) | 0 | 0 | 7 | 72 | 84 | 179 | 0 | 97 |

TABLE 7-continued

| | Examples of this invention | | | Comparative Examples | | | | |
|---|---|---|---|---|---|---|---|---|
| | Test No. | | | | | | | |
| | 7 | 8 | 9 | 10 | 11 | 12 | 13 | 14 |
| | Resin | | | | | | | |
| Properties | A | B | C | D | E | J*1 | K*2 | L*3 |
| Cut resistance (mm) | 0.7 | 0.5 | 0.9 | 4.2 | 3.8 | 25 | 1.1 | 3.8 |

Notes
*¹Process oil: Sundex 790 (Sun Oil Co.)
*²Rosin: Gum Rosin WW (Arakawa Rinsan Kagaku Co.)
*³Single cyclopentadiene resin modified by 30% phenol resin.

These results indicate that blending of the specified resins of this invention in the rubber compositions elevates adhesiveness of rubbers and can also markedly improve flex cracking resistance, wear resistance and cut resistance without causing deterioration of the tensile characteristics.

EXAMPLE 20

Preparation of Resins (Resins A–I)

Resins A to E were obtained from the same process of polymerization as Example 19. There were also obtained copolymer resins of DCPD and styrene or phenol for sake of comparison. The properties of these resins are shown in Table 5. Then 50 parts of resin A and resin B were dissolved respectively in 100 parts of n-heptane, and each mixture was fed into a 1-liter autoclave together with 6 parts of a 50% nickel-alumina supported catalyst. After filling the interior space of the autoclave with 70 kg/cm² of hydrogen, the mixture was reacted at the temperature of 230° C. for 4 hours. Hydrogenated resins H and I were obtained by removing the catalyst and n-heptane from the respective reaction solutions. The softening point of resin H was 102° C. and that of resin I was 103° C.

Hot-Melt Compositions

Each of the compositions prepared from the undermentioned prescription was kneaded at 180° C. for 2 hours and applied in a 0.2 mm thick and 25 mm wide aluminum foil at 140° C. by using an applicator such that the film thickness would become 50μ, and two aluminum sheets were bonded together by 1.5-second heat bonding at 140° C. to prepare a test piece. Each of the thus prepared test pieces was subjected to a peel test according to JIS K 2531 and tensile strength according to JIS K 6301.

For the rating of compatibility, the respective compositions were observed by a phase contrast microscope, and those having indistinct phase boundaries were rated as excellent, those with distinct phase boundaries were rated as bad, and those with intermediate degree of distinctness were rated as good. As for heat resistance, those compositions which have suffered almost no change of softening point of resin were rated as excellent, those suffering a wide change were rated as bad, and those with intermediate degree of change were rated as good. The results are shown in Table 8.

| Prescription: | |
|---|---|
| Sumitate KC-10 (an ethylene-vinyl acetate copolymer produced by Sumitomo Chemical Co., vinyl acetate content: 28 wt %, MI: 150) | 35 parts |
| 160'F paraffin wax (produced by Nippon Seirou Co.) | 20 parts |
| Specimen | 45 parts |

TABLE 8

| | Example No. | Specimen | Compatibility | Tensile strength (kg/cm²) | Peel strength (g/25 mm) | Heat resistance |
|---|---|---|---|---|---|---|
| Examples of this invention | 1 | A | Excellent | 49.4 | 3200 | Good |
| | 2 | B | " | 52.8 | 4110 | Excellent |
| | 3 | C | " | 50.4 | 3910 | " |
| | 4 | H | " | 52.6 | 3960 | Very excellent |
| | 5 | I | " | 53.0 | 4120 | Very excellent |
| Comparative Examples | 6 | D | Bad | 39.1 | 1800 | Bad |
| | 7 | E | " | 31.4 | 2600 | Excellent |
| | 8 | F | " | 38.1 | 1870 | Bad |
| | 9 | G | " | 40.1 | 2290 | Good |
| | 10 | J* | Excellent | 30.7 | 3950 | " |

Note
*Rosin: Gum Rosin WW (produced by Arakawa Rinsan Kagaku Co.)

What is claimed is:

1. A thermally copolymerized resin having a softening point of 50° to 200° C., a number average molecular weight of 300 to 1,500 measured by vapor pressure osmometry and a bromine number of less than 120 and soluble in hydrocarbon solvents, the composition of said resin comprising (a) 30 to 97 mol % of one or more monomeric substances selected from cyclopentadiene, dicyclopentadiene and alkyl-substituted compounds thereof, and (b) 3 to 70 mol % of one or more hydroxystyrene derivatives.

2. The resin according to claim 1, wherein said resin has a composition comprising (a) 40 to 95 mol % of the monomeric substance and (b) 5 to 60 mol % of the hydroxystyrene derivative.

3. The resin according to claim 2, wherein the monomeric substance is dicyclopentadiene and the hydroxystyrene derivative is isopropenylphenol.

4. A method of producing a copolymerized resin, characterized in that a starting monomer component comprising (a) 30 to 97 mol % of one or more monomeric substances selected from cyclopentadiene, dicyclopentadiene and alkyl-substituted compounds thereof and (b) 3 to 70 mol % of one or more hydroxystyrene derivatives is copolymerized thermally at a temperature of 240° to 300° C. without using any catalyst.

5. The method according to claim 4, wherein the starting monomer component comprises 40 to 95 mol % of dicyclopentadiene and 5 to 60 mol % of isopropenylphenol.

6. The method according to claim 4, wherein the polymerization temperature is 250° to 280° C.

7. The method according to claim 4, wherein the polymerization is carried out in the presence of a solvent selected from aromatic hydrocarbon, aliphatic hydrocarbon and alicyclic hydrocarbon.

8. The method according to claim 4, wherein the alkyl-substituted compound of cyclopentadiene is methylcyclopentadiene and the alkyl-substituted compound of dicyclopentadiene is methyldicyclopentadiene or dimethyldicyclopentadiene.

9. The method according to claim 4, wherein the hydroxystyrene derivative is o-, m- or p-isomer of vinylphenol, propenylphenol, isopropenylphenol, vinylcresol, isopropenylcresol, hydroxystibene, vinylisopropylphenol, isopropenylisopropylphenol, vinyl-tert-butylphenol, isopropenyl-tert-butylphenol, vinylethylphenol, isopropenylethylphenol, vinyldimethylphenol, vinyldiisopropylphenol, isopropenyldiisopropylphenol, vinylmethylethylphenol, isopropenyldimethylphenol or isopropenylmethylethylphenol.

10. A copolymerized resin obtained by the method of claim 4.

* * * * *